Dec. 8, 1970 J. VAN BAARDEWIJK 3,546,672
PULSE-SUPPLYING ARRANGEMENTS
Filed Nov. 4, 1966
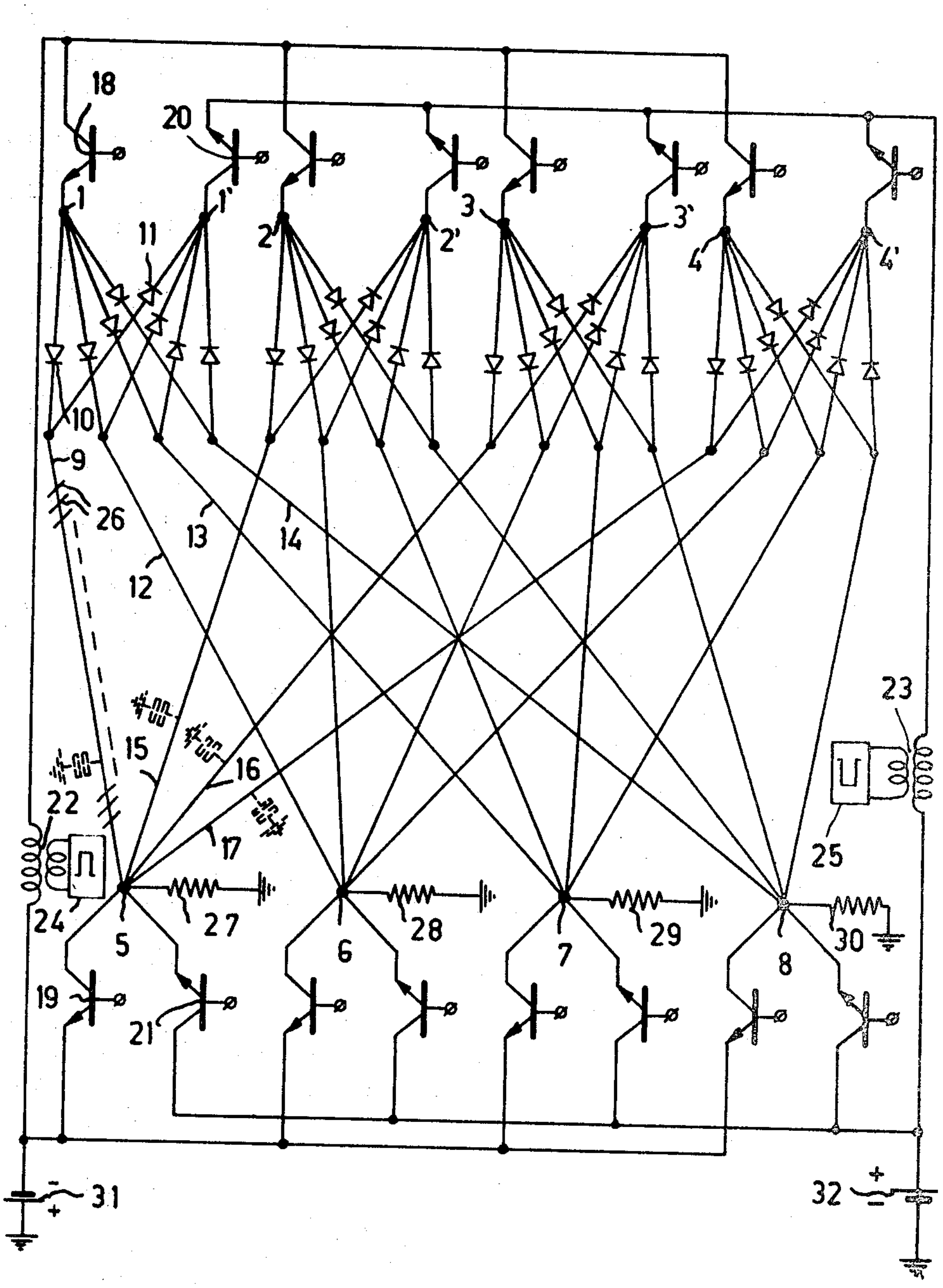
INVENTOR.
JOHANNES VAN BAARDEWIJK
BY
Frank R. Jifani
AGENT United States Patent Office 3,546,672
Patented Dec. 8, 1970

3,546,672
PULSE-SUPPLYING ARRANGEMENTS

Johannes Van Baardewijk, Hilversum, Netherlands, assignor, by mesne assignments, to U.S. Philips Corporation, New York, N.Y., a corporation of Delaware Filed Nov. 4, 1966, Ser. No. 592,092
Claims priority, application Netherlands, Nov. 19, 1965, 6515022
Int. Cl. H04q 3/00, 5/00
U.S. Cl. 340—166 3 Claims

ABSTRACT OF THE DISCLOSURE

The disclosure herein describes a pulse supplying arrangement in a memory matrix having a plurality of coordinate read and write lines. Each of the lines includes a suitable unilaterally conducting device, and pulses are routed to selected lines by means of switches located at each end of the respective lines. In order to improve the pulse response characteristics of each selected line, each non-selected line is electrically decoupled from the switch which is shared commonly with a selected line by means of a blocking potential applied to each unilateral conducting device in each non-selected line.

The invention relates to a pulse-supplying arrangement comprising a common pulse source and several pulse lines which are each connected in series with a decoupling rectifier between the inputs and outputs of a selection matrix, the pulse source being provided with two output terminals between which the pulses are produced, while between each input and output respectively of the selection matrix and one and the other output terminal respectively of the pulse source there is connected a controllable switch.

Such pulse-supplying arrangements are used inter alia in three-dimensional magnet core storages for supplying half-write and half-read pulses to the X and Y drive lines.

The known pulse-supplying arrangement has the disadvantage that the shape of the pulses is considerably influenced by the stray capacitances of the non-selected drive lines.

The object of the invention is to provide a pulse-supplying arrangement of the aforementioned type in which the said disadvantage is eliminated.

A pulse-supplying arrangement in accordance with the invention is characterized in that one end of each pulse line is connected through a resistor to a point of constant potential while the decoupling rectifiers are provided at the other ends of the pulse lines, means further being provided for selectively supplying a blocking potential to both ends of each pulse line so that the decoupling rectifiers included in the non-selected pulse lines are blocked.

This pulse-supplying arrangement has the advantage that half-write and half-read pulses can be obtained having considerably shorter rise times and pulse flanks of considerably higher definition.

The invention and its advantages will now be described more fully with reference to an embodiment shown in the drawing.

The pulse-supplying arrangement shown in the drawing serves for selectively applying positive and negative pulses to one of a number of pulse lines. The pulse lines are located in the cross-points of a selection matrix which forms part of a coordinate selection switch. The example chosen is a selection matrix of 4 x 4 having altogether 16 cross-points. The selection matrix shown has four pairs of inputs 1–1′, 2–2′, 3–3′ and 4–4′ and four outputs 5, 6, 7 and 8. Between each pair of inputs and each output provision is made of a pulse line one end of which is directly connected to the input while its other end is connected through decoupling rectifiers polarized in opposite senses to one and to the other input respectively of the pair of inputs. For example, pulse line 9 is connected at one end to the output 5 and its other end is connected through the rectifiers 10 and 11 polarized in opposite senses to the inputs 1 and 1′, respectively. The current pass direction of the rectifier 10 is assumed to be a positive current direction. The pulse lines located between the pair of inputs 1–1′ and the remaining outputs are designated by 12, 13 and 14, respectively. The pulse lines located between the output 5 and the remaining pairs of inputs are designated by 15, 16 and 17. The co-ordinate switch includes for the positive current direction a group of input transistors acting as a switch the emitters of which are connected to the inputs 1, 2, 3 and 4 and a group of output transistors the collectors of which are connected to the outputs 5, 6, 7 and 8. For example, the emitter of the input transistor 18 is connected to the input 1 while the collector of the output transistor 19 is connected to the output 5. The co-ordinate selection switch further includes for the negative current direction a group of input transistors the collectors of which are connected to the inputs 1′, 2′, 3′ and 4′ and a group of output transistors the emitters of which are connected to the outputs 5, 6, 7 and 8. For example, the collector of the input transistor 20 is connected to the input 1 while the emitter of the output transistor 21 is connected to the output 5.

The collectors of the input transistors for the positive current direction, among which transistor 18, are connected to one end of the secondary of an inductive repeater 22 while the emitters of the output transistors for the positive current direction, among which transistor 19, are connected to the other end of the secondary. In quite the same manner, the emitters of the input transistors for the negative current direction, among which transistor 20, are connected to one end of the secondary of an inductive repeater 23 while the collectors of the output transistors for the negative current direction, among which transistor 21, are connected to the other end of the secondary. A pulse source 24 is connected to a primary of the repeater 22, which source serves for transmitting positive pulses to the secondary side. A primary of the repeater 23 has connected to it a pulse source 25 which serves for transmitting negative pulses to the secondary side.

The pulse lines are, for example, the X or Y drive lines of a three-dimensional magnet core storage and the pulse source 24 is, for example, the source of the half-write pulses and pulse source 25 the source of the half-read pulses. Each pulse line is coupled with a large number of magnet cores, for example, 2600 magnet cores, which are distributed on 26 storage faces. In the drawing, this is shown for the pulse line 9 one magnet core of which is designated by 26. Before a positive read pulse is applied to a pulse line, the input transistor and output transistor for the positive current direction associated with the pulse line are changed to the conductive state. Before a negative half-read pulse is applied, the associated input transistor and output transistor for the negative current direction are changed to the conductive state. In the case of pulse line 9, the transistors 18 and 19 are rendered conducting before a half-write pulse is applied, while the transistors 20 and 21 are rendered conducting before a half-read pulse is applied. The transistors can be controlled at their bases by pulses which begin before the appearance of the half-write pulse and the half-read pulse, respectively, and which terminate after the end of the half-write pulse and the half-read pulse, respectively.

In practice, the drive lines of a large three-dimensional magnet core storage have a high stray capacitance, more particularly with respect to the inhibition lines or Z-drive lines. In the drawing, the stray capacitance of the drive lines 9, 15, 16 and 17 are represented by concentrated capacitors shown in dotted lines which are connected to earth by one end. In practice, the stray capacitance of the pulse line is distributed along its length. When *n* pulse lines are joined at one point, for example, output 5, the stray capacitance of this point becomes approximately *n*-fold. This *n*-fold stray capacitance adversely affects the shape of the half-write and half-read pulses, more particularly with high-speed storages and with short cycle times.

In the relevant pulse-supplying arrangement, the outputs 5, 6, 7 and 8 of the selection matrix are connected to earth through the resistors 27, 28, 29 and 30 added to each of them. The emitters of the output transistors for the positive current direction, among which transistor 19, are connected to the negative terminal of a bias voltage battery 31 the positive terminal of which is connected to earth. Furthermore, the collectors of the output transistors for the negative current direction, among which transistor 21, are connected to the positive terminal of a bias voltage battery 32 the negative terminal of which is earthed. The operation is now as follows. By way of example, the case is considered in which a positive half-write pulse must be applied to the pulse line 9. Before the appearance of the half-write pulse, control pulses are simultaneously applied to the bases of the transistors 18 and 19, which pulses change these transistors to the conductive state. The duration of the control pulses is such that the transistors 18 and 19 remain conducting for the whole duration of the half-write pulse. When the transistor 19 becomes conducting, the negative potential of the negative terminal of the bias voltage battery 31 is applied to the output 5 of the selection matrix through the emitter-collector path of the transistor 19. Thus, the stray capacitance of the output 5 is charged rapidly to the negative potential of battery 31 and the output 5 is held at a constant negative potential for the whole pulse duration. The negative potential of battery 31 likewise reaches the input 1 of the selection matrix through the secondary of repeater 22 and the collector-emitter path of transistor 18. At this negative potential all the rectifiers connected to the input 1 except rectifier 10 are blocked owing to the fact that the other ends of the associated pulse lines 12, 13 and 14 are earthed through resistors. The negative potential of battery 31 is chosen so that the potential of input 1 remains negative with respect to earth for the duration of the half-write pulse. Thus, it is achieved that the rectifiers connected to input 1 except rectifier 10 remain blocked for the duration of the half-write pulse. These blocked rectifiers decouple the stray capacitances of the pulse lines 12, 13 and 14 from the input 1. The half-write pulse appearing after the beginning of the control pulses now flows through pulse line 9 without being influenced by the stray capacitances of the pulse lines connected to the same input or output as the pulse lines 9. Thus, half-write pulses can be obtained having a considerably shorter rise time and a pulse flank of considerably higher definition.

The second example considered is the case in which a half-read pulse must be applied to the pulse line 9. In this case, control pulses are simultaneously applied to the bases of the transistors 20 and 21. The positive terminal of bias voltage battery 32 then reaches the output 5 through the collector-emitter path of transistor 21 so that the output is charged to the positive potential of battery 32 and is held at this positive potential for the duration of the half-read pulse. The positive terminal of battery 32 also reaches the input 1′ through the secondary of the repeater 23 and the emitter-collector path of transistor 20. Thus, the rectifiers connected to the input 1′ except rectifier 11 are blocked and the positive potential is chosen so that these rectifiers remain blocked for the duration of the half-read pulse. Consequently, the half-read pulse is not influenced by the stray capacitances of the pulse lines connected to the same input and output as the pulse line 9. As a result, half-read pulses can be obtained having a considerably shorter rise time and a pulse flank of considerably higher definition, just like in case of the half-write pulses.

When recapitulating, it can be ascertained that by the use of the pulse-supplying arrangement described, an important obstacle to obtaining high-speed magnet core storages reliable in operation is eliminated so that this use affords great advantages.

What is claimed is:

1. A pulse supplying arrangement, comprising, pulse means for applying a pulse, said pulse means having a pair of terminals, a plurality of pulse lines, each of said pulse lines including a rectifier, a first plurality of selectively operable switching means connecting one end of each of said pulse lines to one of said pulse means terminals, a second plurality of selectively operable switching means connecting the other end of each of said pulse lines to the other of said pulse means terminals, an individual one of said first and second plurality of switching means responsive to a predetermined signal applied thereto for causing a pulse from said pulse means through each of said first and second switching means to propagate along at least one of said plurality of pulse lines, means for selectively applying a blocking potential to each of said pulse lines for effectively blocking each non selected pulse line rectifier, said pulse lines being arranged in a plurality of groups, each of said groups being connected to a respective one of said first switching means switches, each respective line of each of said groups being individually connected to each of said second switching means switches, one end of each of said pulse lines connected by a resistor to a point of reference potential, said means applying a blocking potential connected to each junction formed by said resistor and said pulse line through said second switching means, and to the other end of each of said pulse lines through said pulse means and said first switching means.

2. The combination of claim 1 wherein each of said first and second switching means comprises a transistor.

3. A low noise pulse line selection arrangement comprising means for applying pulses, a plurality of groups of pulse lines, each of said pulse lines including a rectifier, a first plurality of selectively operable switching means, a second plurality of selectively operable switching means each group of pulse lines coupled between an individual one of said first plurality switching means and each of said second plurality of switching means, means for selecting one of said first switching means and one of said second switching means to form a series circuit of said means applying a pulse and one of said pulse lines, and means for developing a blocking potential across each rectifier in each non selected line for effectively blocking each non selected pulse line rectifier and thereby decoupling the stray capacitance associated with each non selected line from the selected line, one end of each of said pulse lines connected by a resistor to a point of reference potential, said means applying a blocking potential connected to each junction formed by said resistor and said pulse line through said second switching means, and to the other end of each of said pulse lines through said pulse means and said first switching means.

References Cited

UNITED STATES PATENTS

| | | | |
|---|---|---|---|
| 3,308,433 | 3/1967 | Lochinger ---------- | 340—166 |
| 3,098,216 | 7/1963 | Samwel ---------- | 307—115X |

THOMAS B. HABECKER, Primary Examiner

M. SLOBASKY, Assistant Examiner

U.S. Cl. X.R.

307—115